United States Patent
Glass et al.

(10) Patent No.: US 10,181,139 B2
(45) Date of Patent: Jan. 15, 2019

(54) AUTOMATED WORKSPACE USAGE MANAGEMENT METHODS AND APPARATUS

(71) Applicants: John M Glass, Boulder Creek, CA (US); Barbara Sprenger, Felton, CA (US); Alexander Sinishin, Sofia (BG)

(72) Inventors: John M Glass, Boulder Creek, CA (US); Barbara Sprenger, Felton, CA (US); Alexander Sinishin, Sofia (BG)

( * ) Notice: Subject to any disclaimer, the term of this patent is extended or adjusted under 35 U.S.C. 154(b) by 0 days.

(21) Appl. No.: 13/651,449

(22) Filed: Oct. 14, 2012

(65) Prior Publication Data
US 2014/0108064 A1 Apr. 17, 2014

(51) Int. Cl.
*G06Q 30/04* (2012.01)
*G06Q 10/06* (2012.01)
*G06Q 10/10* (2012.01)

(52) U.S. Cl.
CPC ....... *G06Q 30/04* (2013.01); *G06Q 10/06398* (2013.01); *G06Q 10/1091* (2013.01)

(58) Field of Classification Search
CPC ............ H04L 43/0876; H04L 12/1435; H04L 12/1496; H04L 67/141; H04L 67/2814
USPC .......... 705/5, 1.1, 7.11; 703/1; 707/E17.005, 707/E17.008
See application file for complete search history.

(56) References Cited

U.S. PATENT DOCUMENTS

| | | | |
|---|---|---|---|
| 6,622,116 B2 | 9/2003 | Skinner et al. | |
| 7,149,698 B2 * | 12/2006 | Guheen et al. | 705/319 |
| 7,181,421 B2 | 2/2007 | Peterson et al. | |
| 7,222,293 B1 | 5/2007 | Zapiec et al. | |
| 7,289,619 B2 | 10/2007 | Vivadelli et al. | |
| 2001/0042032 A1 | 11/2001 | Crawshaw et al. | |
| 2002/0129139 A1 | 9/2002 | Ramesh | |
| 2002/0175211 A1 | 11/2002 | Dominquez | |
| 2003/0005055 A1 | 1/2003 | Ralston et al. | |
| 2003/0055665 A1 | 3/2003 | Fleming | |
| 2004/0133487 A1 * | 7/2004 | Hanagan | G06F 17/30607 705/34 |
| 2004/0267623 A1 | 12/2004 | Vivadelli et al. | |
| 2005/0137934 A1 * | 6/2005 | Handler et al. | 705/14 |

(Continued)

FOREIGN PATENT DOCUMENTS

WO 2001093559 A1 12/2001

OTHER PUBLICATIONS

Planon, "Save Money, Track Resources with Flexible Workspace," 2011, 1 pg., http://www.planonsoftware.com/solutions-flexible-workspace.htm.

(Continued)

*Primary Examiner* — Akiba K Allen
(74) *Attorney, Agent, or Firm* — Franklin & Associates International Inc; Matthew Lambrinos (57) ABSTRACT

Automated workspace usage management methods and apparatus associate one or more users with membership plans for usage of at least one workspace resource. Workspace usage data is collected from the one or more automated monitoring devices for monitoring workspace resource usage by one or more users. The collected workspace usage data is first measured and then compared against the membership plans associated with the users. A billing-and/or reporting-related action is performed, according to the measurement of collected workspace usage data compared against the membership plan.

20 Claims, 6 Drawing Sheets

(56) References Cited

U.S. PATENT DOCUMENTS

| | | | |
|---|---|---|---|
| 2006/0010236 A1* | 1/2006 | Meiser et al. | 709/226 |
| 2006/0015375 A1 | 1/2006 | Lee et al. | |
| 2006/0015376 A1 | 1/2006 | Sattler et al. | |
| 2007/0162315 A1 | 7/2007 | Hodges | |
| 2008/0059253 A1* | 3/2008 | Vivadelli et al. | 705/5 |
| 2008/0109289 A1 | 5/2008 | Vivadelli et al. | |
| 2008/0114683 A1 | 5/2008 | Neveu et al. | |
| 2008/0177646 A1 | 7/2008 | Frink | |
| 2009/0204916 A1* | 8/2009 | Benedek et al. | 715/764 |
| 2009/0228406 A1* | 9/2009 | Lopez et al. | 705/412 |
| 2009/0248704 A1 | 10/2009 | Greenwell et al. | |
| 2009/0300174 A1* | 12/2009 | Floris et al. | 709/224 |
| 2010/0186072 A1 | 7/2010 | Kumar | |
| 2010/0223170 A1 | 9/2010 | Bahar | |
| 2010/0299180 A1 | 11/2010 | Tsatalos et al. | |
| 2011/0022474 A1* | 1/2011 | Jain et al. | 705/14.66 |
| 2011/0213686 A1* | 9/2011 | Ferris et al. | 705/34 |
| 2012/0226796 A1* | 9/2012 | Morgan | 709/224 |
| 2012/0226808 A1* | 9/2012 | Morgan | 709/226 |
| 2014/0237626 A1* | 8/2014 | Marcus | G06Q 10/06 726/28 |

OTHER PUBLICATIONS

NFS, "Hoteling and Hot Desk Management," 2011, 2 pgs., http://www.nfs-hospitality.com/hot_desking_hoteling.html.

Ware et al. "Market Segmentation and Development for Remote Work Center," Feb. 2007, 20 pgs., http://www.thefutureofwork.net/assets/RWC_Market_Segmentation.pdf.

NCH Software, "FlexiServer Productivity & Attendance Software," 2010, 2 pgs., http://www.nchsoftware.com/flexi/index.html.

Freedom Teleworkers Home Page, 2010, 8 pgs., http://www.freedomteleworkers.com/teleworker_faq.html.

EBSuite, "Time Sheet Tracking," Dec. 31, 2009, 2 pgs., http://crm.ebsuite.com/iPrd_Time-Invoice-Billing-timesheet.shtml.

Rodgers et al., "Telecommuting and the Computer . . . Here Today, Home Tomorrow," Graphic Systems, Inc., 2000, pp. 1-10, http://www.graphicsystems.biz/gsi/articles/Telecommuting_00January.PDF.

BT Openworld, "BT Openworld Broadband to Launch ADSL Teleworker Package," 2010, 3 pgs., http://www.btopenworld.com/broadband/forwork/press_releases/pr_teleworker.html.

Kis-Kiosk, "PeopleCube and Kiosk Information Systems Partner to Deliver Innovative Reservation Kiosk Solutions," Business Wire, 2008, 4 pgs., http://web.archive.org/web/20081007112718/http://www.kis-kiosk.com/public/archives/000096.html.

* cited by examiner

| 801 PLAN 1 | Workspace A | Workspace B | Workspace C |
|---|---|---|---|
| Monthly Access Limit | 9 hrs | 20 hrs | unlimited |
| Excess Usage Charge | $25 / hr | $5 / hr | 0 |
| Printing Limit | 100 pages | 100 pages | 0 |
| Excess Printing Charge | $2 / page | $1 / page | N/A |

| 802 PLAN 2 | Workspace A | Workspace B | Workspace C |
|---|---|---|---|
| Monthly Access Limit | 2 hrs | unlimited | 30 hrs |
| Excess Usage Charge | $25 / hr | $5 / hr | $1 / hr |
| Printing Limit | 100 pages | 100 pages | 0 |
| Excess Printing Charge | $2 / page | $1 / page | N/A |

AUTOMATED WORKSPACE USAGE MANAGEMENT METHODS AND APPARATUS

TECHNICAL FIELD

The present invention relates to workspace management. More particularly, but not exclusively, the invention relates to automated management of workspace resource usage.

BACKGROUND

It is known for a business to authorize an employee access to a building and the monitor of the employee when present in the building. Known automated systems provide for monitoring such employee access and attendance.

Embodiments seek to provide improvement thereover by providing apparatus and methods for automatically managing workspace resources within different environments.

SUMMARY

According to a first aspect, there is provided a computer-implemented method for automated workspace center usage management. The method can comprise, for each one of a plurality of users, associating the user with a particular membership plan for usage of at least one workspace resource; collecting monitored workspace resource usage data from at least one automated workspace monitoring device for monitoring usage of at least one workspace resource by at least one of the users; measuring collected workspace usage data for a particular user compared against the membership plan associated with the user for performing a billing- and/or reporting-related action, according to the measurement of collected workspace usage data compared against the membership plan.

According to another aspect, an apparatus for automatically managing workspace usage is provided. The apparatus can comprise at least one automated access monitoring device; a management processor operably connectable to the at least one automated access monitoring device; a data bus being coupled to the management processor; and a computer-usable medium embodying computer program code; the computer-usable medium being coupled to the data bus; and the computer program code comprising instructions executable by the management or and configured for: each one of a plurality of users, associating a user with a particular membership plan for usage of at least one workspace resource; collecting workspace resource usage data from at least one automated monitoring device and monitoring usage of at least one workspace resource by at least one of the users; measuring the collected workspace usage data for a particular user compared against the membership plan associated with the user; performing a billing- and/or reporting-related action, according to the measurement of collected workspace usage data compared against the membership plan.

According to yet another aspect, there is provided a computer-usable medium for automated workspace usage management with the computer-usable medium embodying computer program code. The computer program code comprises computer executable instructions configured for: each one of a plurality of users, associating the user with a particular membership plan for usage of at least one workspace and/or workspace resource; collecting workspace usage data from the at least one automated monitoring device for monitoring usage of the workspace resource by at least one of the users; measuring the collected workspace usage data for a particular user compared against the membership plan associated with the user; and performing a billing- and/or reporting-related action, according to the measurement of collected workspace usage data compared against the membership plan.

BRIEF DESCRIPTION OF THE DRAWINGS

Embodiments are further explained, by way of example, reading the following descriptions in conjunction with the appended drawings, in which.

DETAILED DESCRIPTION

Reference will now be made in more detail to the non-limiting exemplary environments in which one or more embodiments of methods and apparatus for automated workspace usage management are implemented. Workspace usage is defined herein to mean accessing and utilizing a workspace resource. A workspace resource is defined herein to mean any type of resource associated with a workspace. Non-limiting examples of such workspace resources include workstations, open spaces, offices, conference rooms, business services, cloud-based software, site-based software, videoconference equipment, printers, mail stations, copiers and other types of workspace equipment.

Users may be, for example, non-employees, employees, clients, and members; the workspace environment may be different for different types of users.

Figure 1:
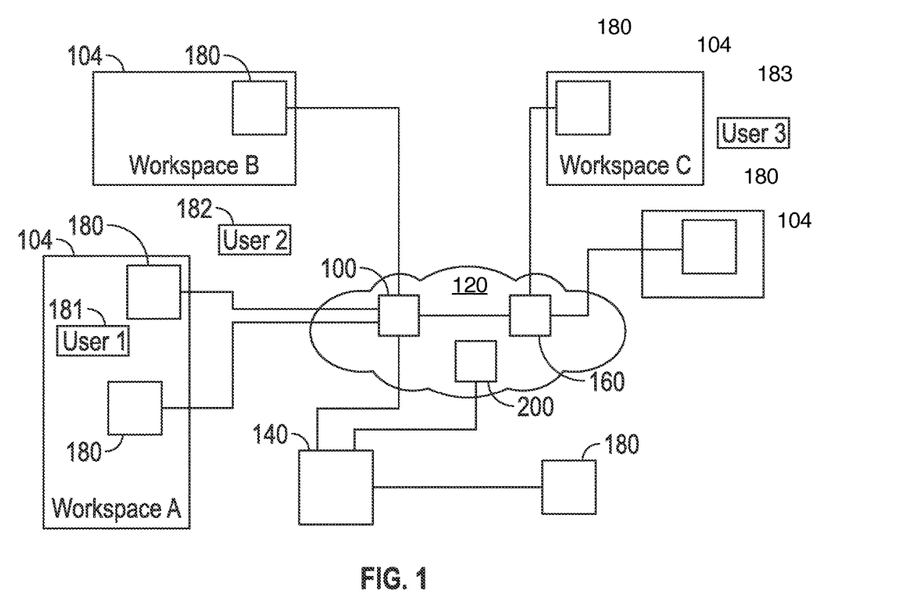
FIG. 1 is an exemplary schematic diagram of one of many different environments wherein the embodiments may be practiced, according to one embodiment.

Attention is drawn to FIG. 1, an exemplary schematic diagram of one of many different environments wherein embodiments may be practiced. A network server site 100 is provided within a network 120, which is, for example, the Internet, but equally can be any one of, a combination of, or an interconnection of, but not restricted to: a local area network (LAN); a wide area network (WAN): a home network; a wireless network, and telecommunications.

A management processor apparatus 140 communicates with the network server site 100 to collect workspace usage data contributed from any one or more of a plurality of automated workspace usage monitoring devices 180 for monitoring usage of workspaces 104, each of which can be coupled to communicate with the network server site 100, to deliver workspace usage data to the network server site 100 and, thence, for the network server site 100 to deliver the collected workspace usage data to the management processor apparatus 140.

Workspace usage data can be delivered by one or more of the automated monitoring devices 180, either directly (as shown) to the management processor apparatus 140 or via a non-network chain of delivery using a succession of storage devices (not shown).

By way of a non-limiting example, the monitoring device 180 can be a computer or other electronic circuitry that monitors the amount of usage of a particular workspace resource, such as a piece of office equipment. The usage parameter being monitored can be the time and duration that the equipment is being utilized and/or other properties, such as, but not limited, to the volume of printing performed by the user, number of faxes being performed, etc.

Another non-limiting example of a workspace usage monitoring device 180 is an RFID scanner and an RFID card system for monitoring access time by any one or more users to any one or more workspace resources 104. (RFID refers to radio frequency identification.) In one or more examples, the workspace usage monitoring device 180 is also capable of authorizing access to the workspace resource 104, in addition to monitoring the usage of the workspace resource. For example, if the workspace usage monitoring device 180 is a door entry RFID card access system, the device may be utilized by the automated workspace management apparatus 140 to monitor access to a workspace site and, if desired, may additionally be utilized by the automated workspace management apparatus 140 to authorize access to the workspace site (A, B, or C), according to a user's membership plan and/or payment history.

Any one or more of the automated usage monitoring devices 180 can be a device for monitoring consumption of any one or more of a plurality of the workspace resources 104 associated with the workspace site.

The usage data collected from the automated usage monitoring devices 180 can be of any form and is data representing workspace-related usage, such as, but not limited to, the consumption of a workspace resource by the user. For example, the usage data can represent the attendance time at a workspace site for the purpose of monitoring usage of the workspace site. For any type of workspace resource, the collected workspace resource-related usage data can represent workspace resource usage per unit of time, such as workspace usage per day, per week, per month and can be provided to the management processor apparatus 140 in this format, or the processor can determine the workspace usage per unit of time from the collected data.

In FIG. 1, the management processor apparatus 140 is shown as an entity external to the network 120. It can be appreciated that the management processor 140 can be provided within the network sever site 100, and the workspace usage management process can perform under user control from one or more sets of user apparatus external to the network 120, connectible for control communication to the network server site 100. It can also be appreciated that any one of the individual network sites 100, 160, 200 can be a so called "cloud" where the function of an individual site 100, 160, 200 is disseminated among one or more actual network server sites; nevertheless, it is accessed using a single network address.

Figure 2:
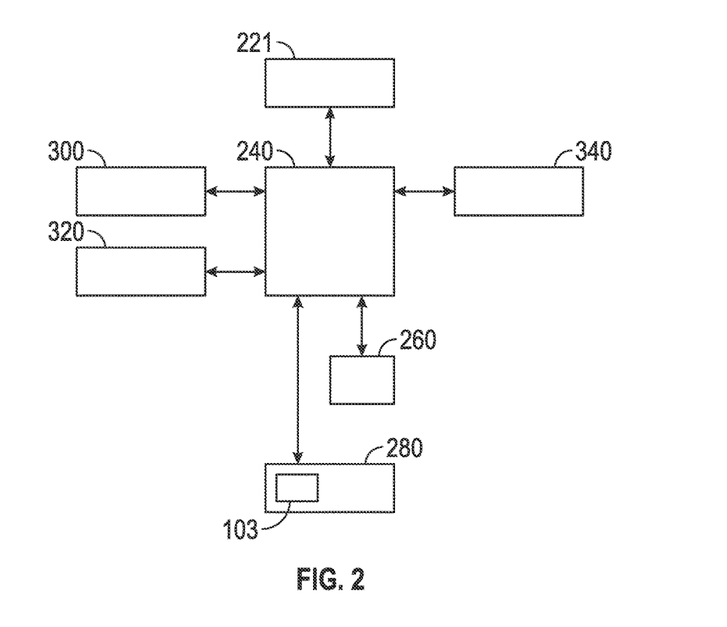
FIG. 2 shows an exemplary block diagram of a typical system capable of putting a method for automatic management of workspace usage into practice, according to one embodiment.

Attention is next drawn to FIG. 2. Typically, one or more embodiments are carried out using a data processing system, such as, but not limited to, a management processor apparatus 140 having the system shown in FIG. 2.

A network interface 221 is coupled to a central processing unit (CPU) 240 is operable to execute a program under control of program software provided in a random access memory (RAM) 260, also in a storage memory 280, such as a disc drive. The storage memory 280 and the RAM 260 are also available to the CPU 240 for temporary or permanent storage of results and data.

The CPU 240 is coupled to receive input from one or more input devices, such as, but not limited to, a pointing device 300, such as a computer mouse or touchscreen, and a text input device 320, such as a keyboard or touch screen.

The CPU 240 also drives a display 340 that displays images and provides sounds as controlled and provided by the CPU 240.

The system, as described in relation to FIG. 2, can also be split and disseminated into several parts or network clouds. Any system can be utilized that is capable of implementing the software modules, providing workspace usage management functionality for any one or more examples as described hereafter.

Figure 3:
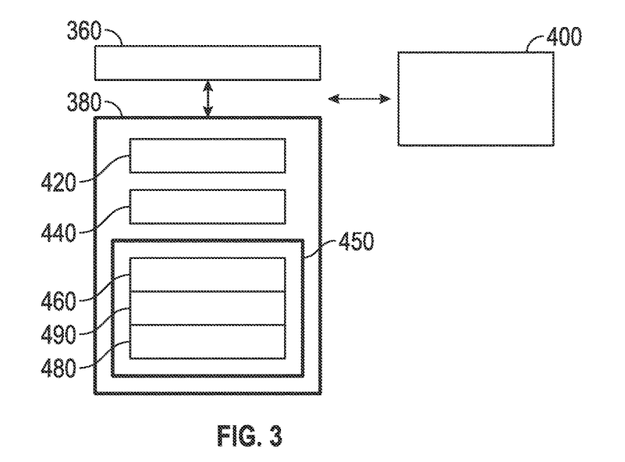
FIG. 3 is an exemplary block diagram illustrating the program content of the central processing unit (CPU), according to one embodiment.

Attention is next drawn to FIG. 3, an exemplary block diagram illustrating the program content of the CPU 240.

The CPU 240 is organized and driven by an operating system 360 that, together with the rest of the computer, runs a workspace usage management software package 380. Operating system 360 also runs interface software 400, permitting access, when required, to allow interaction with internet sites 100, 160, 200, 120 of FIG. 1 and integral devices, such as the pointing device 300 of FIG. 2, the text input device 320 of FIG. 2, as well as any data input and output sockets.

Figure 4:
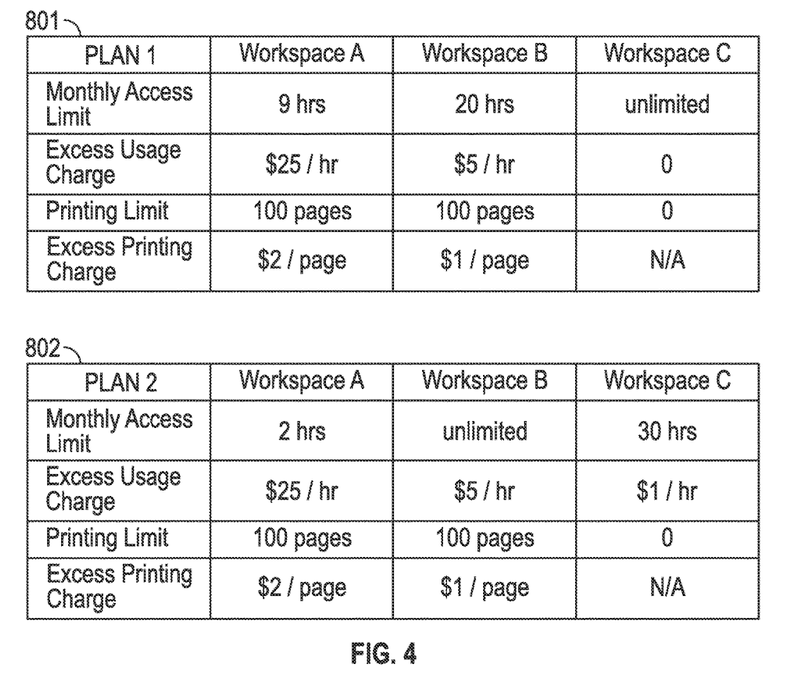
FIG. 4 is an exemplary illustration of a first membership plan and a second membership plan, according to one embodiment.

The workspace usage management package 380 of FIG. 4 comprises a workspace resource usage data collection module 420 that allows the management processor apparatus 140 of FIG. 1 to communicate with workspace monitoring devices 180 of FIG. 1 and, if necessary, membership storage system 440, and to collect monitored workspace resource usage information from the devices and/or storage system. Membership storage system 440 is a database, library or other storage system that stores membership data associated with respective member/users of the workspaces. While the membership storage system 440 is shown as part of the workspace usage management package, the membership storage system may be implemented separately from the package either locally or remotely.

The membership data stored in the storage system 440 of FIG. 3 comprises membership plan data and can also include collected monitored usage data that has accumulated over time for each member/user. Examples of first and second membership plans, 801 and 802, are illustrated in FIG. 4. For the sake of clarity, the plans are shown in a simplified format, each plan defining the particular workspace usage profile for each particular workspace.

Workspace usage management package 380 of FIG. 3 also comprises a workspace billing/reporting component 450 that includes a usage data sorter package 460 to enable the management processor apparatus 140 to sort the usage data collected by module 420 on a per member/user basis.

The billing/reporting component 450 further comprises a usage comparator 490 for measuring the collected usage data against membership plan data associated with the member/user whose usage is being tracked.

The billing/reporting component 450 further comprises biller/report 480 for performing a billing- and/or reporting-related automated action, according to the measurements made by the usage comparator package.

The billing/reporting component 450 is operable to cause the management processor apparatus 140 of FIG. 1 to execute a billing and/or reporting program, as hereafter described.

FIG. 3 is one non-limiting example of the workspace resource management package software, according to one embodiment. In other embodiments, workspace usage management package 380 may include an authorizing module for authorizing the monitoring devices and/or other devices to allow usage of a particular resource, according to a user's particular circumstances, such as, but not limited to, the user's membership plan and/or payment history. Also, in other embodiments, the software package may include a monitoring module for controlling the monitoring operation of the monitoring devices.

Figure 5:
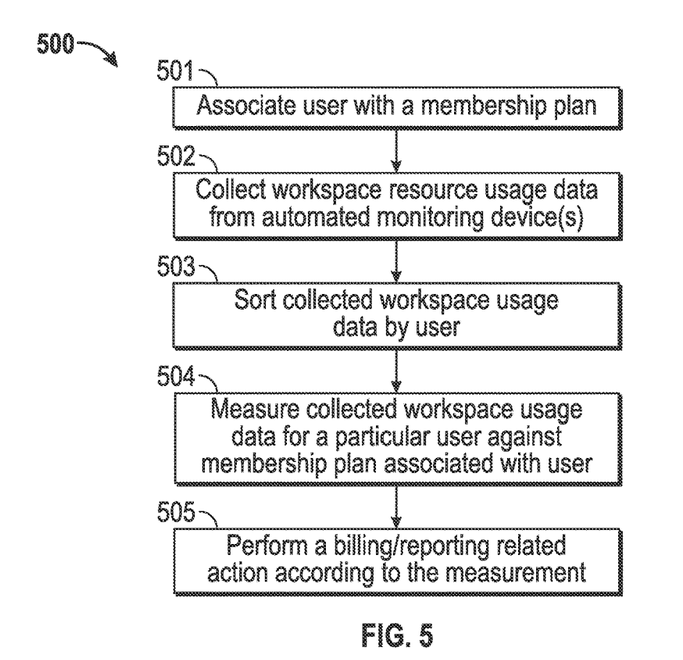
FIG. 5 is an exemplary flowchart illustrating one way in which an automated workspace center usage management software package can manage workspace resources, according to one embodiment.

Attention is next drawn to FIG. 5, an exemplary flowchart illustration one way in which the automated workspace usage management package 380 can cause the management processor apparatus 140 to automatically track and bill/report workspace usage for each user, based on a user's membership plan.

For each user, a first operation 501 of FIG. 5 associates a user with a membership plan for usage of any one or more workspace resources, thereby making the user a member/user. A second operation 502 automatically collects monitored workspace usage data from the monitoring device(s). A third operation 503 sorts the collected workspace usage data by user; that is, it separates out data associated with workspace resource usage by each particular user. A fourth operation 504 measures the collected workspace usage data compared against the membership plan associated with a particular member/user. A fifth operation 505 performs a billing- and/or reporting-related action, according to the measurement of workspace usage data compared against the membership plan.

Method 500 of FIG. 5 can be performed in real time, thereby ensuring that billing- and/or reporting-related actions are performed as needed and on demand.

Turning now in more detail to FIG. 5, the first operation 501 involves associating a user with a membership plan for usage of any one or more workspace resources. A membership plan defines included workspace usage amounts for any one or more of a plurality of workspaces 104, and defines charges associated with the workspace usage. A non-limiting example of such membership plans illustrated in FIG. 4 are first plan 1, 802 and second plan 2, 802 which respectively define included workspace resource usage amounts for respective workspaces A, B & C. Usage amounts included in a membership plan may be, for example, attendance amounts that define the amount of time a user can have access to a workspace resource and/or consumption amounts that define the amount of the workspace resource that a user can consume. One non-limiting example of a workspace resource consumption limit is the printing page limit associated with operating a printer.

Each membership plan also defines charges that a member/user incurs for workspace resource usage, under which charges may comprise charges for exceeding the workspace usage included in the user's membership plan. In the non-limiting example of FIG. 4, the second membership plan 802 is different from first membership plan 801. For example, second membership plan 802 defines included workspace resource usage and/or usage charges for first, second and third workspaces (workspaces A, B, C of FIG. 1) that are different from included usage and/or usage charges recited in the first membership plan 801 for those same first, second and third workspaces.

At least some of the users may be associated with the same membership plan or different membership plans. By way of non-limiting example, a first user 181 is associated with a first membership plan 801, a second user 182 is associated with the second membership plan 802, a third user 183 is associated with the second membership plan 802, etc. (see FIGS. 1 & 4). Furthermore, in one embodiment, each membership may be customized to a particular user. For example, one or more membership plans may be customized to include individual usage amounts for one or more workspaces, such that one or more users have a unique customized membership that meets the specific needs of the individual user. The result is that different users, for example, may be billed at different rates, according to different levels of membership defined by their membership plans, as will be explained in more detail below.

The first operation 501 of FIG. 5 of associating a user with a membership plan for usage of one or more workspaces can be implemented in various ways. A user is associated to a particular membership plan by the management processor apparatus 140 for setting up the membership plan, according to instructions received from a user interface of the computer terminal or other electronic device, such as a smartphone that is operated by the user or another party, such as an administrator. In one example, a user may have to purchase or subscribe to the membership in order to be made a member/user.

Turning now in more detail to FIG. 5, the second operation 502 involves collecting monitored workspace resource usage data from the one or more monitoring devices 180. In one example, the software management package causes the management processor to receive usage data from the monitoring devices 180 over the network 120. The management processor 140 collects for each member/user, usage data captured by the automated usage monitoring devices at any one or more workspaces. Collecting workspace usage data can include collecting from the monitoring devices workspace data over the course of a specific time window, such as, but not limited to, days, weeks, or months for each user and then storing it in the storage system, thereby accumulating the workspace usage data.

Turning now in more detail to FIG. 5, the third operation 503 involves sorting collected workspace usage data by user. The automated workspace resource management software is configured to identify which collected data is associated with which user and then separate out the data for each user. For example, the collected monitored data includes user identifiers, such as numbers, to identify which data is associated with which respective users and the management processor 140 of FIG. 1 filters the collected data by user identifier. In one example, the management processor is capable of identifying collected usage data, representing usage of each workspace resource for each particular user that is being received in real-time from the monitoring devices 180 and/or that has been previously stored and accumulated in the storage system. For such an example, sorting operation 503 includes sorting data by user and by workspace resource.

Sorting operation 503 may not be desired in some embodiments. For example, for environments in which each workspace usage monitoring device is dedicated to monitoring usage exclusively by a particular user, sorting the data by the management processor may not be needed as the processor can identify data associated with a particular user merely by identifying the user's monitoring device from which monitored data is being received. In another example, sorting may be performed by the monitoring access device itself as the management processor is configured to accept data on a user-by-user basis.

Turning now in more detail to FIG. 5, the fourth operation 504 involves measuring the collected workspace usage data compared against the membership plan associated with the user. The management processor looks up the particular membership plan associated with the user and then measures the collected captured usage data for the user compared against the membership plan.

In one embodiment, the measuring operation can comprise measuring the collected usage data compared against the membership plan to determine whether the workspace usage either exceeds or is below at least one usage threshold defined by the membership plan. The management processor 140 is capable of identifying for a particular user the collected usage data, representing usage of respective workspaces 104 and respective workspace resources for each particular user. The management processor 140 is also capable of measuring workspace usage associated with respective workspaces 104 for comparison against corresponding workspace usage thresholds defined in the membership plan associated with the user.

By way of a non-limiting example, the management processor 140 actually collects usage data that represents 10 hours of user access for the first workspace 104 (Workspace A) and 20 hours of user access for the second workspace 104 (Workspace B) over a one-month period. If the user's membership provides a monthly access limit of nine hours under first workspace A and 20 hours to the second workspace B, as shown in the first plan 801 of FIG. 4, the management processor measures and compares 10 hours access against the nine-hour membership limit for accessing the first workspace and 20 hours access against the 20-hours membership limit for accessing the second workspace. The resulting measurement is a measurement reflecting an excess of one hour for the first workspace A and zero hours excess for the second workspace B. In another non-limiting example, a pre-set charge is recorded if a complete usage cannot be calculated because of inadequate automated information from access or equipment monitoring devices.

Turning now in more detail to FIG. 5, the fifth operation 505 involves the operation for performing a billing- and/or reporting-related automated action, according to the measurement of workspace usage data. The billing-related automated action can comprise a variety of different actions. By way of example, the billing-related automated action can be any action related to the process of billing a user for workspace resource usage, such as, but not limited to, the calculation of a workspace usage charge, compilation of a usage statement, generation of a report, generation of a bill/invoice and sending of a bill/invoice. In one embodiment, performing the billing-related automated action can comprise determining a workspace usage charge, according to the measurement of workspace usage data compared against the membership plan and then automatically billing, based on the workspace usage charge. In one example, the management processor 140 can determine a workspace usage charge, according to the membership plan, in response to determining whether the collected workspace usage exceeds the corresponding threshold. For example, the management processor can automatically calculate the workspace usage in excess of the membership plan usage threshold(s) by calculating the workspace usage charge from the excess workspace usage and at least one workspace usage rate defined in the membership plan.

Automatic billing can be performed by automatically generating an invoice/bill reflecting the determined workspace charge and automatically charging a credit card, sending an email invoice or sending the bill to an address stored in the membership plan of the user. Alternatively, performing the billing-related automated action can comprise determining that there is no workspace usage charge and no automated billing needs to be sent.

In one embodiment, performing the reporting-related automated action 505 comprises the operation of automatically generating one or more reports for a user or other party, based on the collected usage data for the user and the associated membership plan.

The generated bill, automatic credit card charge and/or report can reflect the workspace usage that is within membership plan limits and workspace usage that exceeds the membership limits. The bill and/or report can reflect this information on a per-workspace and per-user basis. The method can include automatically sending the reports to the user or other party.

The flowchart of FIG. 5 illustrates the method for automated workspace resource usage management for each one particular user, using one or more workspaces. In practice, the method of FIG. 5 is implemented for each and every one of a plurality of users; and in some embodiments, there will be numerous users in which each is associated with a respective membership plan. At least some of the users can access and use the same or different workspaces.

The flowchart of FIG. 5 is purely exemplary, and the skilled person will be aware of many variations and clear improvements that can be made without departing from the embodiments, as filed. Furthermore, the sequence of operations of the method of FIG. 5 is not limited to the sequence of operations depicted in FIG. 5.

For example, according to another embodiment of the method 500, performing the billing-related automated action 505 can comprise automatically billing and receiving payment, as well as controlling the automated access monitoring device 180 of FIG. 1 to either refuse or allow access in response to receiving payment.

In yet another embodiment, method 500 includes an authorization process step (not shown) in which an authorization module of the software management module communicates with the automated usage monitoring device 180 or another device to authorize and control access to a particular workspace resource, according to a user's membership plan and/or payment history. The management processor 140 sends an authorization to the automated usage monitoring device 180 to permit a verified member/user to use the workspace resource. For example, in one embodiment, the automated usage monitoring device 180 shown in FIG. 1 is an RFID scanner whereby the user swipes an RFID card over the RFID scanner for gaining access to a workspace via the workspace entrance. The management processor receives over the network the RFID scan information and verifies the user information and compares it against the user's membership plan stored in the membership plan storage system. If a user has been verified, according to the membership plan, to access the particular workspace and/or workspace resource, the management processor commands the automated usage monitoring device 180 to allow the user access to the workspace via the workspace entrance, for example, by the access device automatically unlocking a door. In the event that the user information is not verified, a command is sent to deny the user access to the workspace and/or workspace resource.

In one non-limiting example, if the user does not scan in or out (there is not a pair of scans), the system sends out an anomaly notice to both administration and the user, and a preliminary default scan is inputted for a particular amount of time. Also, in one example, a camera system is embedded such that if an entry/exit door is opened without a scan, the anomaly is tied to a visual report. At the beginning of each day, administration views the anomalies of the previous day and updates the files manually.

Reference will now be made to an embodiment in which the workspace management system of the embodiments described hereinbefore is implemented for managing distributed remote workspace centers (RWCs). With the technological advances in high-speed connectivity, information storage, virtual private networks and cloud computing, there are many employees, contractors and other knowledge workers who are now able to work anywhere and, increasingly, include workers who may either work in, or use services of, professional office spaces that do not belong to their company or third-party managed RWCs. RWCs, a new type of workspace, are located in downtown or neighbourhood commercial cores near where employees live. With internet security advances, workers from different companies and in different roles can work in the same office space. As more people walk, bike, or have a very brief drive to work, substantial $CO_2$ emission savings are realized from avoided commuting.

A corporation, for example, might desire to implement a telecommuter program, but having workers work from their homes poses problems with security and accountability. There are other uses for and users of a RWC, as well. A person may run his or her own business from home, but find they are more productive and happier in an office environment. A start-up business might need an environment with integrated office services to get off the ground without huge capital outlays. An RWC can provide security and accountability for employees and employers with many different needs, but RWCs lack a way to automatically track and bill the many different types of members they must accommodate. Because of this problem employers have with automatically tracking and billing their many different customers, RWCs typically must make a choice: if they provide 24/7 access to users; they must charge more than an occasional user might want to pay. Alternatively, they could be open only during standard business hours and, therefore, only need to provide staffing to track and monitor usage by users or members during that time.

Figure 6:
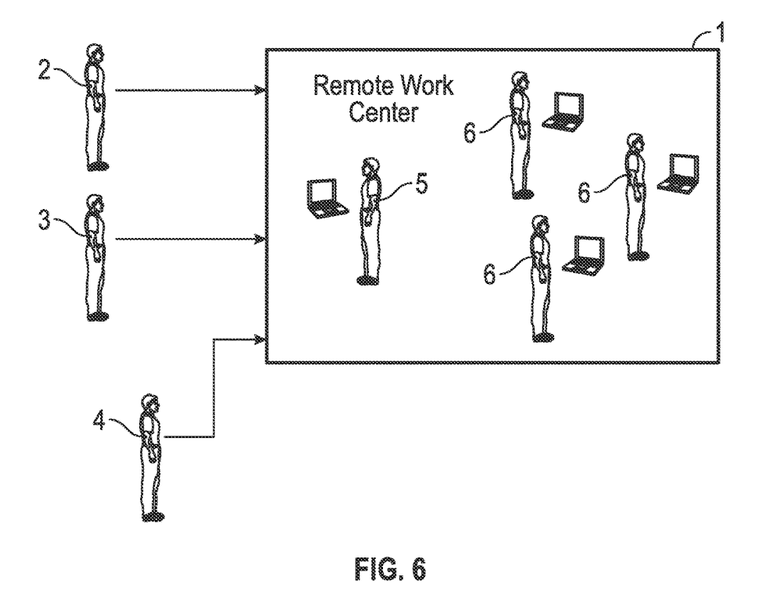
FIG. 6 is an exemplary high-level schematic diagram illustrating how a remote workspace center usage management system can be utilized to set up a membership plan, according to one embodiment.
Figure 7:
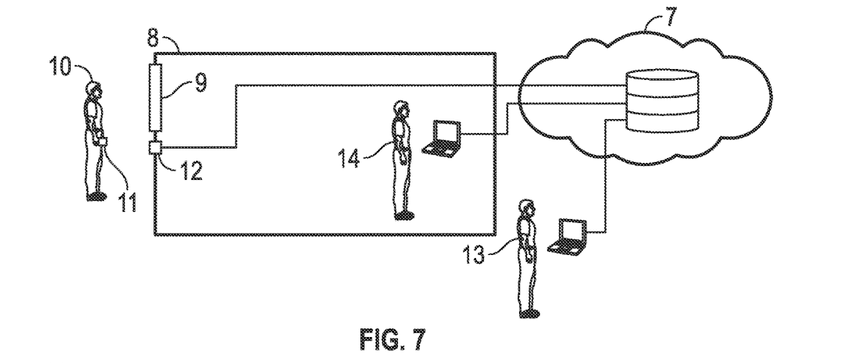
FIG. 7 is an exemplary schematic diagram of a remote workspace center usage management server operably connectable to a local user terminal and remote terminal via a network, according to one embodiment.

For example, in one embodiment depicted in FIG. 6 in which the workspace comprises a remote work center (RWC), a user, employer or RWC staff can set up an individualized membership at RWC 1 for each user. Different users, for example, are billed at different rates. User 2, for example, may purchase a membership that includes unlimited access to the center, while user 3 might pay for each hour of use and user 4 might use the center for free at certain times and pay for use at others. RWC staff 5 can create different memberships to meet the needs of different users 6, specifying how much and when those other RWC users will be billed. The workspace usage management system automatically bills the responsible party for the correct amount, based on membership and use. The system does not rely on the user reserving space ahead of time (although they can), and it does not rely on the "honor system" to determine a user's attendance or use of resources, The automated workspace management system 7 of FIG. 7 can monitor and report on a user's attendance at RWC 8. Upon arrival at and departure from, the RWCs entrance 9, user 10 swipes an RFID card 11 over a scanner 12; the embodiment aggregates this attendance information and makes it available as a report to users, employer 13 and RWC staff 14. System 7 determines if the user or his/her company should be billed for this usage, based on the user's membership plan. By use of the system's automatically generated attendance data, employer 13 can track their workers' attendance at the RWC and better assess an employee's productivity. System 7 can automatically notify (via email) user 10, employer 13, or RWC staff 14 of anomalous events in the access system; if system 7 determines that user 10 should be charged for time usage at center 8, user 10 or his/her employer 13 will automatically be billed for this time usage. Specifically, if the user's membership plan provides for nine hours per day of usage of the RWC, but the user uses ten hours of time, one hour will automatically be charged to the user or employer, based on the rates specified in their individual membership plan.

Figure 8:
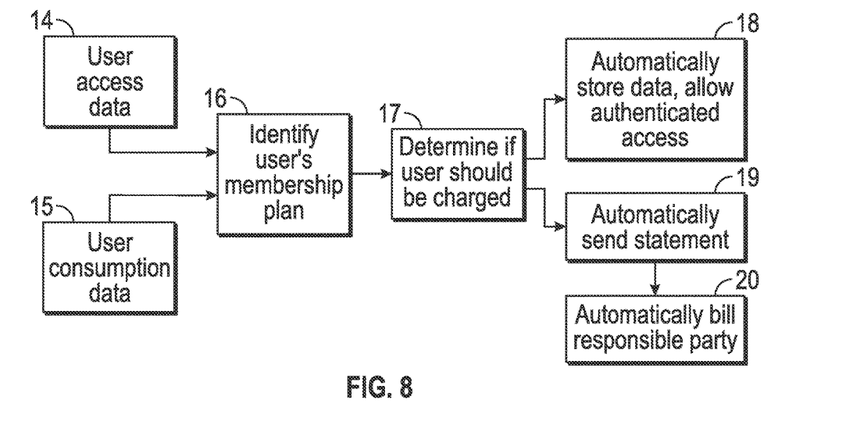
FIG. 8 is an exemplary flowchart outlining a method for automatically tracking, billing and/or reporting workspace resource usage of the remote workspace center, according to one embodiment.

Referring now to FIG. 8, a method for automatically tracking, billing and/or reporting usage of the RWC, user access data 14 and user consumption of resources 15 are processed through the system. The user's membership plan is identified in process 16. Next the system determines if the user should be charged in process 17. Whether or not the user is charged, the system automatically captures the user's access data 14 and consumption data 15 for reporting in process 18. If a financially responsible party is to be billed, the credit card is charged or the statement is automatically sent in process 19, and later process 20 automatically charges or bills the responsible person.

Figure 9:
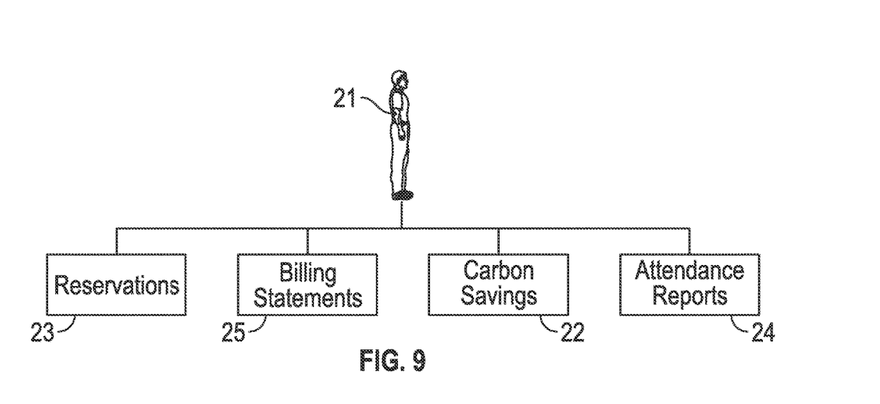
FIG. 9 is an exemplary block diagram outlining reporting components of the remote workspace center usage management system, according to one embodiment.

Referring now to FIG. 9, the embodiments of an RWC's reporting systems are described. By using the system's automatically generated data and original inputs of corporate workplace and employee's home address, employer 21 can track their carbon savings or reduction in greenhouse gas emissions 22 by having workers telecommute from the RWC rather than drive to a corporate headquarters. Resources of the RWC can be reserved via process 23 of the invention. Attendance reports 24 and billing statements 25 are continually updated. Additionally, use, availability and cost of resources or time used can be changed, based on different levels of membership.

Figure 10:
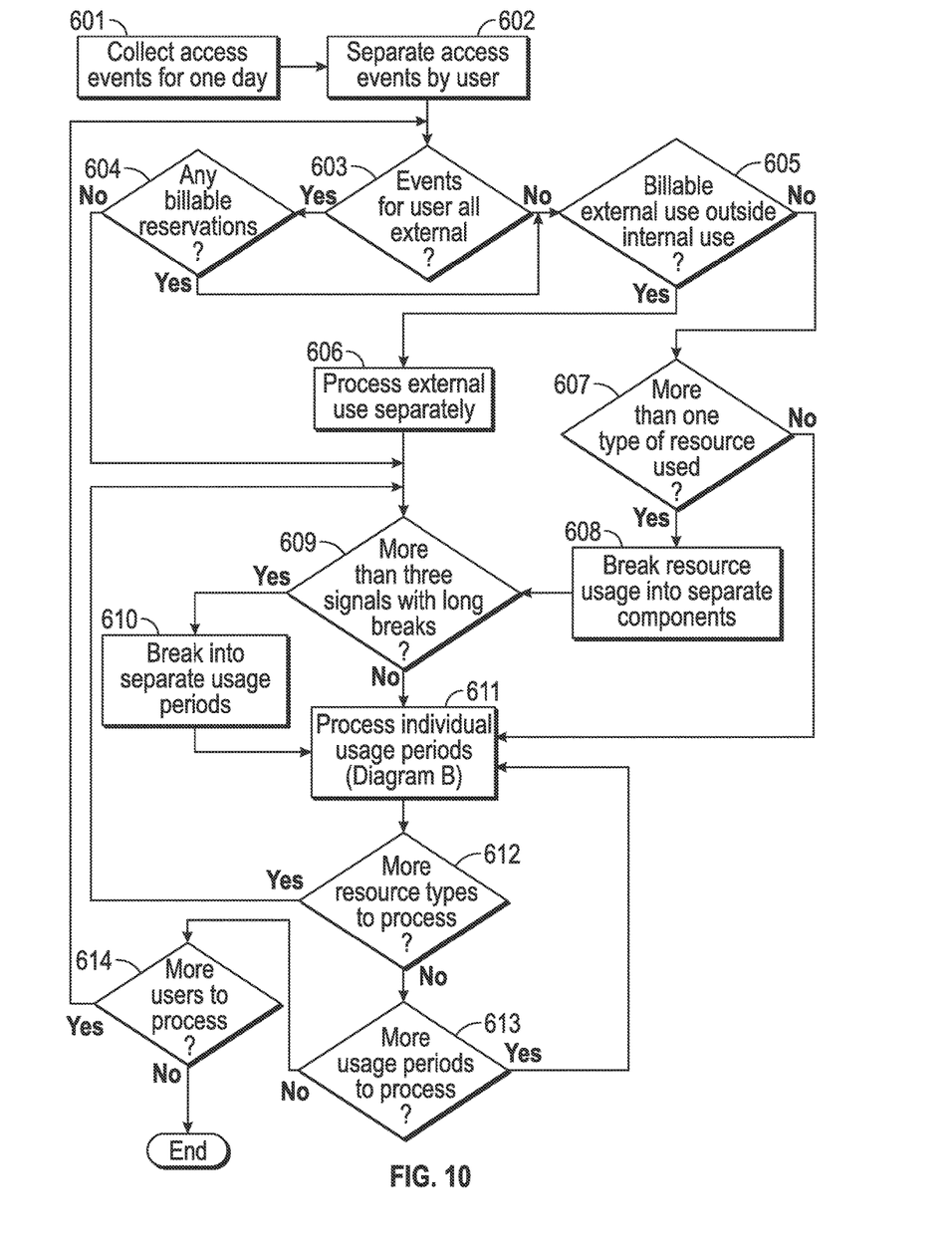
FIG. 10 is an exemplary flowchart detailing a method for automated management of workspace center usage, according to one embodiment.

Reference will now be made to FIG. 10, an exemplary flowchart illustrating a method in which an automated workspace usage management software package operates, according to another embodiment. The method shown in FIG. 10 may be implemented in the workspace environment diagram of FIG. 1.

Initially, workspace resource access events are triggered by a signal, such as a card read at an RFID scanner 601 of FIG. 10. Data representing these access events is automatically imported into a storage device, for example, a database. In one example, access events are all processed at a set time each day. In other examples, the access events are processed a different times or at multiple set times per day.

Access events are matched to members of the workspace center 602. For example, an access card may be associated with a number, and that number is associated with a member. After all events have been associated with members, events for each member are processed.

A determination is made as to whether events for a user are all external (603). External events may be defined as those occurring at a workspace center's exits and entryways, including both separate in and out scanners that may be located at entrances and exits. Workspace centers may be, for example, workspace centers as described hereinbefore with reference to other embodiments. Internal events may be defined as those occurring inside the center, usually associated with a resource of the center, such as an office or a conference room. The events are identified as internal or external and separated into these categories.

If all events are external, it is still possible that a member has reserved an internal resource without triggering any internal events. For example, the member may have reserved a space and forgotten to cancel it. If any reservations exist, these are added to the internal events and processed accordingly 604.

A determination is made as to whether there is billable external use outside internal use 605. If members have used an internal resource, they may still be billed for additional time at the center in which they have not used that resource. For example, the member may trigger an external event by entering the center at 11:00 a.m., then later trigger an internal event when he or she begins using an office there at 12:00 noon. The member may still be billed for one hour of time, according to his or her plan, in addition to the time that the member is billed for using the resource. The member might also, for example, use an internal resource, leave the center, and return at a later time the same day.

If the member has used time beyond the usage times for an internal resource, these external events are processed separately 606.

A determination is made as to whether the member uses more than one type of resource in a center on a given day 607. It is determined in this step if the member has used more than one type of resource. For example, the member might use a conference room and later in the day use a private office. If more than one type of resource has been used, the usage for those resources is processed separately 608.

If the member has triggered more than 3 different events with 3 or more distinct signals, it is possible that the member has left the center for part of the day and returned later. The events are examined to determine if that is the case 609.

If it is determined that the member has left the center for a portion of the day, each of the periods of use is considered a separate usage and processed separately 610. Each individual usage is then processed 611. If there are more different types of internal resources to be processed for this member 612, the processing returns to process step 609. If there are more usage periods to be processed for this member 613, the processing returns to process step 611.

If there are no more usage periods to be processed for this member 614, the processing returns to process step 603 and the events for the next member are processed. If this is the last member to be examined, the processing has ended for that day. The process step 611 of processing individual usages can be implemented in different ways.

Figure 11:
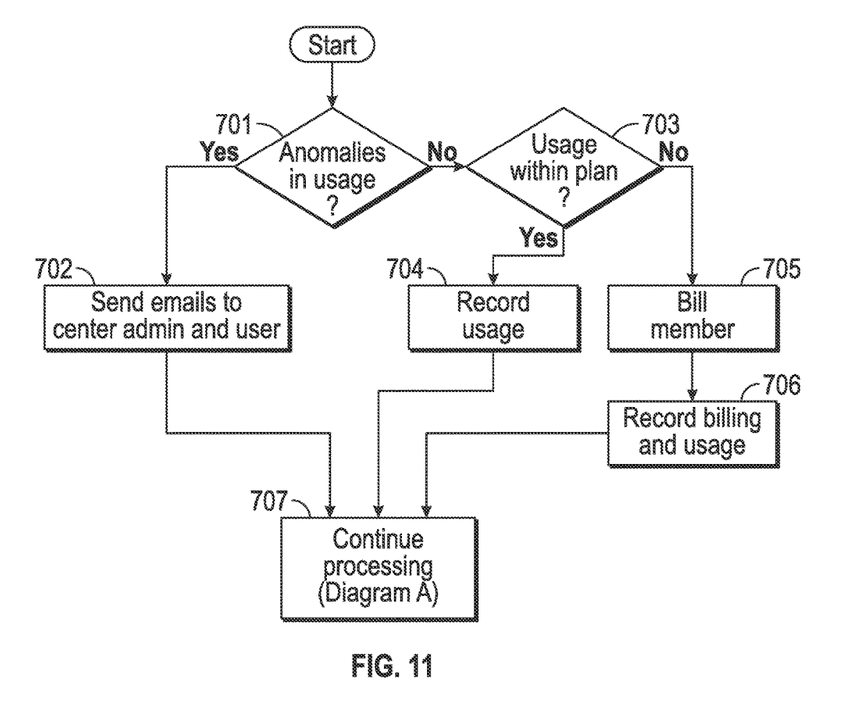
FIG. 11 is a block diagram showing one non-limiting example of the individual usage step processing for the method shown in FIG. 10, according to one embodiment.

FIG. 11 shows in more detail one non-limiting example of the process individual usage step 611, according to one embodiment. If there are anomalies in a usage, for example, the member has only sent one signal or the member has sent two signals in a very short period of time, the usage is determined to be anomalous and processed separately, process steps 701, 703. Anomalous usages trigger an automated email to either or both the center administrator and the member in question, asking them to clarify the details of the usage 702. The usage is later corrected in the database.

If there are no anomalies, the usage is tested to determine if it is within a member's plan 703. For example, if the member has a membership plan that includes five hours of conference room time per month and the member's previous conference room time that month added to the usage for that day is less than or equal to 5 hours, the member has not exceeded his or her planned usage.

If the usage falls completely within the member's plan, the usage is recorded 703, 704. It is not necessary to bill the member at this time. If the usage does not fall within the member's plan, the member is billed 703, 705. The system, for example, might bill their credit card on file or send them an automatically generated invoice, or both.

If the member has been billed, that billing is recorded by the system 706. Processing of other usages continues again 707.

One or more of the aforementioned embodiments allows RWCs to automate and integrate the necessary functions for providing remote workspace on a 24/7 basis without 24/7 staffing, while charging for usage or reservation rather than charging for unlimited access. One or more embodiments automate and integrate the necessary functions for: automatic granting or denying of access to the RWC or multiple RWCs; automatic granting or denying access to some individual private workspaces within the RWC; automatic tracking of workspace usage, services and equipment without reliance on an "honor system"; online access to usage information of user or employer; automatic comparison of a user's individual membership plan against a user's workspace usage data; automatic billing, invoicing and/or credit card charging, based on the membership plan of the user or the user's employer, compared against resource usage; automatic tracking of payments; automatic denial of access, based on payment status; and automatic tracking of avoided vehicle miles travelled (VMTs) and the resulting carbon savings from avoided commutes. Corporations and small businesses can easily track and monitor their employees' attendance, resource usage, and carbon savings. One corporation can easily use these reporting tasks for employees at multiple RWCs.

The invention has been described, so far, in terms of one or more of many possible embodiments. The skilled person will also be aware of different orders and manners of execution which are possible without departing from the invention as claimed.

The invention is further clarified and defined by the following appended claims.

The invention claimed is:

1. A computer-implemented method for automated workspace management using a management processor apparatus comprising a processor and a memory that stores executable instructions, the processor executing the instructions to perform the method, said method comprising:
   for each one of a plurality of users, associating the user with a particular membership plan for usage of a physical workspace of a workspace center;

allowing access to the physical workspace for a user of the plurality of users, a reservation defining the physical workspace and a duration of time for use of the physical workspace by the user;

detecting both external events and internal events, the external events occurring at entrances and exits of the workspace center, the internal events occurring with respect to the physical workspace reserved or additional physical workspaces;

detecting the use of the additional physical workspaces at the workspace center by analysis of the internal events;

detecting usage of workspace resources, wherein each of the workspace resources is associated with a monitoring device that measures time and duration of use of an associated workspace resource which comprises any of workstations, open spaces, offices, conference rooms, business services, cloud-based software, site-based software, videoconference equipment, printers, mail stations, copiers, and combinations thereof;

detecting consumption of consumable workspace resources, wherein each of the consumable workspace resources is associated with an automated usage monitoring device, wherein at least a portion of the consumable workspace resources are controlled by a consumption limit over which charges are incurred;

collecting monitored physical workspace or additional physical workspaces usage data from radio frequency identification (RFID) scanning devices that scan user credentials, the RFID scanning devices being disposed at any of the entrances and the exits of the physical workspace or the additional physical workspaces, usage of the physical workspace or the additional physical workspaces, as well as the external events, wherein a portion of the entrances and the exits are associated with a door lock that is controlled by a workspace automated usage monitoring device that locks and unlocks the door lock;

a management processor that receives the user credentials scan and compares the user credentials with the particular membership plan, the management processor controlling the workspace automated usage monitoring device to lock and unlock the door lock;

transmitting an anomaly notice to an administrator and a user of the plurality of users when both a check-in and check-out scan are not detected by the RFID scanning devices, further wherein a preliminary default scan is inputted for a particular amount of time, further wherein the anomaly notice;

triggering an embedded camera system if an entry or an exit door is opened without a scan, wherein the anomaly notice is tied to a visual report created from the embedded camera system;

measuring monitored and collected physical workspace or additional physical workspaces usage and consumption data for the user compared against the particular membership plan associated with the user;

determining if a billable external event has occurred from analysis of the external events, where external events are billed separately if user has used time beyond the usage times for an internal resource; and performing a billing- and/or reporting-related action, according to the measurement of monitored and collected physical workspace or the additional physical workspaces usage and consumption data, as well as the external billable events, compared against the particular membership plan, wherein a pre-set charge is recorded if the additional physical workspaces usage and consumption data cannot be calculated because of inadequate automated information from the RFID scanning device, the monitoring devices and the automated usage monitoring devices.

2. The method of claim 1, further comprising sorting by user of said collected physical workspace or additional physical workspaces usage data.

3. The method of claim 1, wherein associating the user with a particular membership plan comprises associating the user with a membership plan for usage of the physical workspace or the associated workspace resource.

4. The method of claim 1, wherein associating the user with a particular membership plan comprises associating the user with a membership plan for usage of physical workspace or additional physical workspaces.

5. The method of claim 1, further comprising authorizing the user access to said physical workspace or additional physical workspaces.

6. The method of claim 1, further comprising authorizing the user access to said at least one physical workspace or additional physical workspaces, according to payment history for previous usage of physical workspace or additional physical workspaces by said user.

7. The method of claim 1, further comprising authorizing the user access to said at least one physical workspace or additional physical workspaces, according to receiving an adequate payment method associated with said user.

8. The method of claim 5, further comprising providing an automated reservation system for physical workspace or additional physical workspaces.

9. The method of claim 8, wherein performing a billing-related automated action comprises determining a charge by comparing reservations and collected physical workspace or additional physical workspaces usage data, according to said membership plan, and automatically billing based on the greater of reservation or collected physical workspace or additional physical workspaces usage data.

10. The method of claim 1, wherein notification is automatically sent if a user's complete usage cannot be calculated because of inadequate automated information from access or equipment monitoring devices.

11. The method of claim 1, wherein performing a billing-related automated action comprises determining a workspace usage charge from said measurement of monitored and collected physical workspace or additional physical workspaces usage data, determining, according to said membership plan; and automatically billing based on said physical workspace or additional physical workspaces usage charge.

12. The method of claim 11, wherein measuring said monitored and collected usage data compared against said membership plan comprises measuring whether said monitored and collected usage data either exceeds or is below at least one usage threshold defined by said membership plan.

13. The method of claim 12, wherein performing a billing-related automated action, according to said membership plan, comprises determining for a particular user that no excess physical workspace or additional physical workspaces usage charge has occurred in response to measuring said monitored and collected usage data that is below said usage threshold; or automatically determining for said particular user an excess physical workspace or additional physical workspaces usage charge, according to said membership plan, in response to measuring said monitored and collected usage data that exceeds said usage threshold and automatically billing for said physical workspace or additional physical workspaces usage charge.

14. The method of claim 12, further comprising sorting said monitored and collected usage data by physical workspace or additional physical workspaces, wherein performing a bill-related automated action, according to said membership plan, comprises determining excess usage from measurement of said collected physical workspace or additional physical workspaces usage data for each particular physical workspace or additional physical workspaces compared against corresponding physical workspace or additional physical workspaces usage thresholds included in said membership plan.

15. The method of claim 14, wherein performing a bill-related automated action, according to said measurement of monitored and collected physical workspace or additional physical workspaces usage data, further comprises determining an excess usage charge when comparing excess usage for each particular physical workspace or additional physical workspaces against the corresponding usage rates included in said membership plan.

16. The method of claim 14, wherein said physical workspace or additional physical workspaces comprises a plurality of types of office equipment that are located remotely or locally to the physical workspace.

17. An apparatus for automatically managing workspace usage, said apparatus comprising:
    at least one automated workspace usage monitoring device that collects monitored physical workspace or additional physical workspaces usage and consumption data from radio frequency identification (RFID) scanning devices that scan user credentials, the RFID scanning devices being disposed at any of entrances and exits of at least one physical workspace or the additional physical workspaces, at least a portion of the entrances and exits are associated with a door lock;
    a monitoring device that measures time and duration of use of an associated workspace resource which comprises any of workstations, open spaces, offices, conference rooms, business services, cloud-based software, site-based software, videoconference equipment, printers, mail stations, copiers, and combinations thereof;
    a management processor operably connectable to said at least one automated workspace usage monitoring device;
    a data bus coupled to said management processor; and
    a computer-usable medium embodying computer program code, said computer-usable medium being coupled to said data bus and said computer program code comprising instructions executable by said management processor and configured for:
        each one of a plurality of users, associating a user with a particular membership plan for usage of the at least one physical workspace or additional physical workspaces;
        detecting usage of workspace resources, wherein each at least a portion of the workspace resources is associated with a monitoring device that measures time and duration of use of an associated workspace resource which comprises any of workstations, open spaces, offices, conference rooms, business services, cloud-based software, site-based software, videoconference equipment, printers, mail stations, copiers, and any combinations thereof;
        detecting consumption of consumable workspace resources, wherein each of the consumable workspace resources is associated with an automated usage monitoring device, wherein at least a portion of the consumable workspace resources are controlled by a consumption limit;
        collecting workspace resource usage data from said at least one automated monitoring device for monitoring usage of the physical workspace or additional physical workspaces by at least one of said users and workspace events, wherein the workspace events comprise internal events that occur within the physical workspace and external events that occur at an entrance and exit of a workspace center that comprises the physical workspace or additional physical workspaces;
        receiving the user credentials scan from the RFID scanning devices and comparing the user credentials with the particular membership plan;
        controlling the workspace automated usage monitoring device to lock and unlock the door lock;
        measuring the collected workspace usage data for a particular user compared against the membership plan associated with the user;
    transmitting an anomaly notice to an administration and a user of the plurality of users when both a check-in and check-out scan are not detected by the RFID scanning devices, further wherein a preliminary default scan is inputted for a particular amount of time, further wherein the anomaly notice;
    triggering an embedded camera system if an entry or an exit door is opened without a scan, wherein the anomaly notice is tied to a visual report created from the embedded camera system; and
        performing a billing- and/or reporting-related action, according to the measurement of collected workspace usage data compared against the membership plan, wherein a pre-set charge is recorded if the additional physical workspaces usage and consumption data cannot be calculated because of inadequate automated information from the RFID scanning device, the monitoring devices and the automated usage monitoring devices.

18. The apparatus of claim 17, wherein said instructions executable by said management processor are further configured for:
    determining a physical workspace or additional physical workspaces usage charge from said measurement and said membership plan; and
    billing based on said physical workspace or additional physical workspaces usage charge.

19. A non-transitory computer-usable medium for automated workspace usage management, said computer-usable medium embodying computer program code, said computer program code comprising computer executable instructions configured for:
    each one of a plurality of users, associating the user with a particular membership plan for usage of physical workspace or additional physical workspaces in a workspace center;
    detecting usage of workspace resources, wherein each of the workspace resources is associated with at least one automated monitoring device that measures time and duration of use of an associated workspace resource which comprises any of workstations, open spaces, offices, conference rooms, business services, cloud-based software, site-based software, videoconference equipment, printers, mail stations, copiers, and combinations thereof;

detecting consumption of consumable workspace resources, wherein each of the consumable workspace resources is associated with an automated usage monitoring device, wherein at least a portion of the consumable workspace resources are controlled by a consumption limit;

collecting monitored physical workspace or additional physical workspaces usage data from said at least one automated monitoring device for monitoring usage of the physical workspace or additional physical workspaces by at least one of said users, which comprises radio frequency identification (RFID) scanning devices that scan user credentials, the RFID scanning devices being disposed at any of entrances and exits of the at least one physical workspace or the additional physical workspaces, wherein a portion of the entrances and the exits are associated with a door lock that is controlled by a workspace automated usage monitoring device that locks and unlocks the door lock;

receiving the user credentials scan and compares the user credentials with the particular membership plan;

controlling the workspace automated usage monitoring device to lock and unlock the door lock;

measuring the collected physical workspace or additional physical workspaces usage data for a particular user compared against the membership plan associated with the user;

detecting anomalous user behavior relative to operation of the physical workspace or additional physical workspaces, wherein the anomalous behavior comprises detecting an entry or an exit door being opened without a scan;

triggering an embedded camera system when an entry or an exit door is opened without a scan;

obtaining a visual report of the anomalous user behavior, wherein an anomaly notice is generated and tied to a visual report created from the embedded camera system; and transmitting the anomaly notice and the visual report to the user and an administrator.

20. The medium of claim 19, wherein said computer program code comprises computer executable instructions further configured for:

determining a physical workspace or additional physical workspaces usage charge from said measurement and said membership plan, wherein a pre-set charge is recorded if the additional physical workspaces usage and consumption data cannot be calculated because of inadequate automated information from the RFID scanning device, the monitoring devices and the automated usage monitoring devices; and billing based on said physical workspace or additional physical workspaces usage charge.

* * * * *